(12) United States Patent
Alexiou et al.

(10) Patent No.: US 10,167,943 B1
(45) Date of Patent: Jan. 1, 2019

(54) POWER TRANSMITTING COMPONENT HAVING AN OIL SPOUT FOR GUIDING LUBRICATION

(71) Applicant: BorgWarner Inc., Auburn Hills, MI (US)

(72) Inventors: Arie Alexiou, Pontiac, MI (US); Jason P. Eldred, Swartz Creek, MI (US); Ian Worcester, Royal Oak, MI (US); Hongtao Wang, Rochester Hills, MI (US); Robert W. Green, III, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/904,685

(22) Filed: Feb. 26, 2018

(51) Int. Cl.
| | |
|---|---|
| *F16H 57/04* | (2010.01) |
| *B60K 17/34* | (2006.01) |
| *F16D 13/74* | (2006.01) |
| *F16H 57/08* | (2006.01) |

(52) U.S. Cl.
CPC ......... *F16H 57/0473* (2013.01); *B60K 17/34* (2013.01); *F16D 13/74* (2013.01); *F16H 57/082* (2013.01)

(58) Field of Classification Search
CPC ... F16H 57/0473; F16H 57/082; B60K 17/34; F16D 13/74
See application file for complete search history.

(56) References Cited

U.S. PATENT DOCUMENTS

| | | | |
|---|---|---|---|
| 3,601,515 A * | 8/1971 | Pelizzoni ............ | F16H 57/0493 184/6.12 |
| 4,446,953 A | 5/1984 | Voss et al. | |
| 4,629,050 A | 12/1986 | Valier | |
| 4,841,803 A * | 6/1989 | Hamano ............... | B60K 17/344 180/247 |
| 4,914,968 A * | 4/1990 | Diermeier ............... | F16N 39/06 184/6.24 |
| 5,720,372 A | 2/1998 | Shino et al. | |
| 6,189,669 B1 | 2/2001 | Kremer et al. | |
| 6,779,642 B2 | 8/2004 | Arai et al. | |
| 7,753,173 B2 | 7/2010 | Gratzer et al. | |
| 7,841,449 B2 * | 11/2010 | Nakamura .......... | F16H 57/0447 184/6.12 |
| 7,984,791 B2 * | 7/2011 | Taguchi ............... | F16H 57/0483 184/11.1 |
| 8,316,738 B2 * | 11/2012 | Hellinger ........... | B60K 17/3462 180/247 |
| 9,423,017 B1 | 8/2016 | Francis et al. | |
| 9,506,504 B2 | 11/2016 | Francis et al. | |

(Continued)

*Primary Examiner* — David J Hlavka
(74) *Attorney, Agent, or Firm* — Harness, Dickey & Pierce, P.L.C.

(57) ABSTRACT

A power transmitting device that includes a shaft, a friction clutch, a lubricant passage and an oil spout. The friction clutch defines a lubricant chamber. The lubricant passage is disposed between the shaft and the lubricant chamber and has a passage outlet that intersects the lubricant chamber. The oil spout is received in the lubricant chamber and extends along a longitudinal axis of the shaft such that the oil spout is disposed about the lubricant passage and a portion of a hub portion of the friction clutch. The oil spout diverges radially outwardly from the hub portion with increasing distance from the lubricant passage in a direction toward an outlet of the oil spout.

23 Claims, 6 Drawing Sheets

(56) References Cited

U.S. PATENT DOCUMENTS

| | | |
|---|---|---|
| 9,752,671 B2 * | 9/2017 | Kampe .............. F16H 57/0409 |
| 2005/0202920 A1 | 9/2005 | Kelley |
| 2006/0100053 A1 * | 5/2006 | Asahi .................. F16H 57/029 |
| | | 475/221 |
| 2010/0065395 A1 * | 3/2010 | Baer ...................... F16D 13/52 |
| | | 192/70.2 |
| 2010/0122887 A1 | 5/2010 | Pritchard et al. |
| 2015/0275993 A1 | 10/2015 | Elsesser |

* cited by examiner

POWER TRANSMITTING COMPONENT HAVING AN OIL SPOUT FOR GUIDING LUBRICATION

FIELD

The present disclosure relates to a power transmitting component having an oil spout for guiding lubrication.

BACKGROUND

This section provides background information related to the present disclosure which is not necessarily prior art.

Passive lubrication techniques are commonly employed to lubricate different components of various power transmitting components. Passive lubrication techniques can be desirable due to their relatively low cost. In some situations, however, it can be difficult to obtain robust and reliable lubrication of components in a passive manner were the component spins during operation of the power transmitting component and the lubrication needs to be fed into a radially inner surface of the component. In this regard, surface tension can inhibit migration of the lubrication into a desired area. Moreover, draft (on cast components) and other manufacturing tolerances on the radially inner surface of component may further resist the migration of lubrication into the desired area.

SUMMARY

This section provides a general summary of the disclosure, and is not a comprehensive disclosure of its full scope or all of its features.

In one form, the present disclosure provides a power transmitting device that includes a shaft having an outer circumferential surface, a friction clutch, a lubricant passage and an oil spout. The friction clutch has a clutch hub, a clutch basket, a plurality of first clutch plates, and a plurality of second clutch plates. The clutch hub has a hub portion, which is non-rotatably coupled to the shaft, and a first plate mount that is spaced radially outward from the hub portion to define a lubricant chamber there between. The clutch basket has a second plate mount that is disposed concentrically about first plate mount. The first clutch plates are axially slidably but non-rotatably coupled to the first plate mount. The second clutch plates are axially slidably but non-rotatably coupled to the second plate mount. The second clutch plates are interleaved with the first clutch plates. The lubricant passage is disposed between the shaft and the lubricant chamber and has a passage outlet that intersects the lubricant chamber. The oil spout is received in the lubricant chamber and extends along a longitudinal axis of the shaft such that the oil spout is disposed about a portion of the hub portion and the lubricant passage. The oil spout diverges radially outwardly from the hub portion with increasing distance from the passage outlet of the lubricant passage in a direction toward an outlet of the oil spout.

In another form, the present disclosure provides a power transmitting component that includes a housing, first and second shafts, a friction clutch, drive and driven elements, an endless power transmitting element, a lubricant passage, and an oil spout. The first shaft is supported in the housing for rotation about a first axis. The second shaft is supported in the housing for rotation about a second axis. The friction clutch has a clutch hub, a clutch basket, a plurality of first clutch plates, and a plurality of second clutch plates. The clutch hub has a hub portion, which is non-rotatably coupled to the first shaft, and a first plate mount that is spaced radially outward from the hub portion to define a lubricant chamber there between. The clutch basket has a second plate mount that is disposed concentrically about first plate mount. The first clutch plates are axially slidably but non-rotatably coupled to the first plate mount. The second clutch plates are axially slidably but non-rotatably coupled to the second plate mount. The second clutch plates are interleaved with the first clutch plates. The drive element is coupled to the clutch basket for rotation therewith, while the driven element is coupled to the second shaft for common rotation. The endless power transmitting element engages the drive element and the driven element to transmit rotary power there between. The lubricant passage is disposed between the first shaft and the lubricant chamber and has a passage outlet that intersects the lubricant chamber. The oil spout is received in the lubricant chamber and extends along a longitudinal axis of the shaft such that the oil spout is disposed about the lubricant passage and a portion of the hub portion. The oil spout diverges radially outwardly from the hub portion with increasing distance from the passage outlet of the lubricant passage in a direction toward an outlet of the oil spout.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
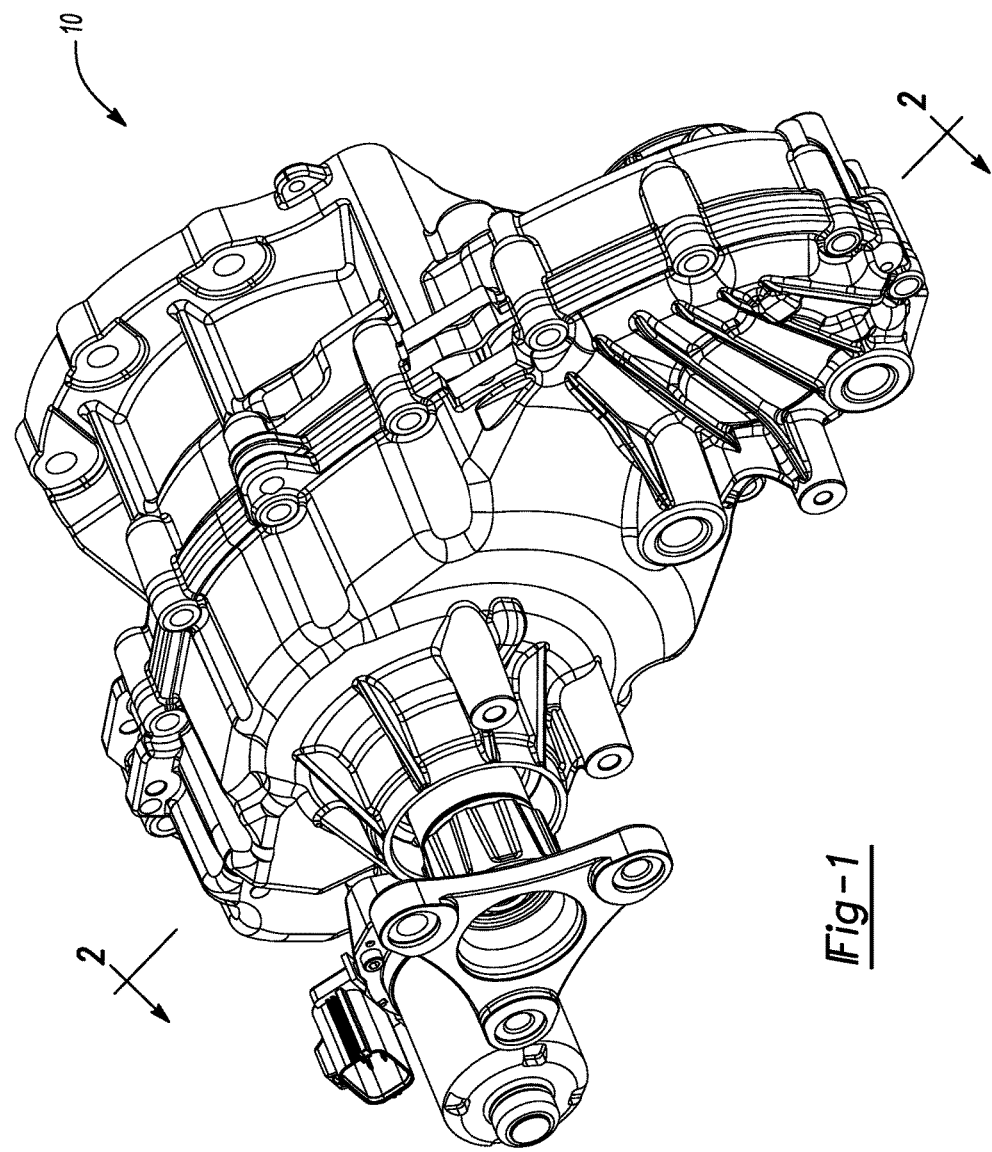
FIG. 1 is a perspective view of an exemplary power transmitting component constructed in accordance with the teachings of the present disclosure.

With reference to FIG. 1, an exemplary power transmitting component constructed in accordance with the teachings of the present disclosure is generally indicated by reference numeral 10. The power transmitting component 10 is illustrated to be a transfer case of the type that is selectively operable in a 2-wheel drive mode and a 4-wheel drive mode. It will be appreciated, however, that the teachings of the present disclosure have application to various other types of power transmitting components, including power take-off units, axle assemblies and electro-hydraulic clutches (e.g., a Haldex® coupling manufactured by Borg-Warner Inc. of Auburn Hills, Mich.).

Figure 2:
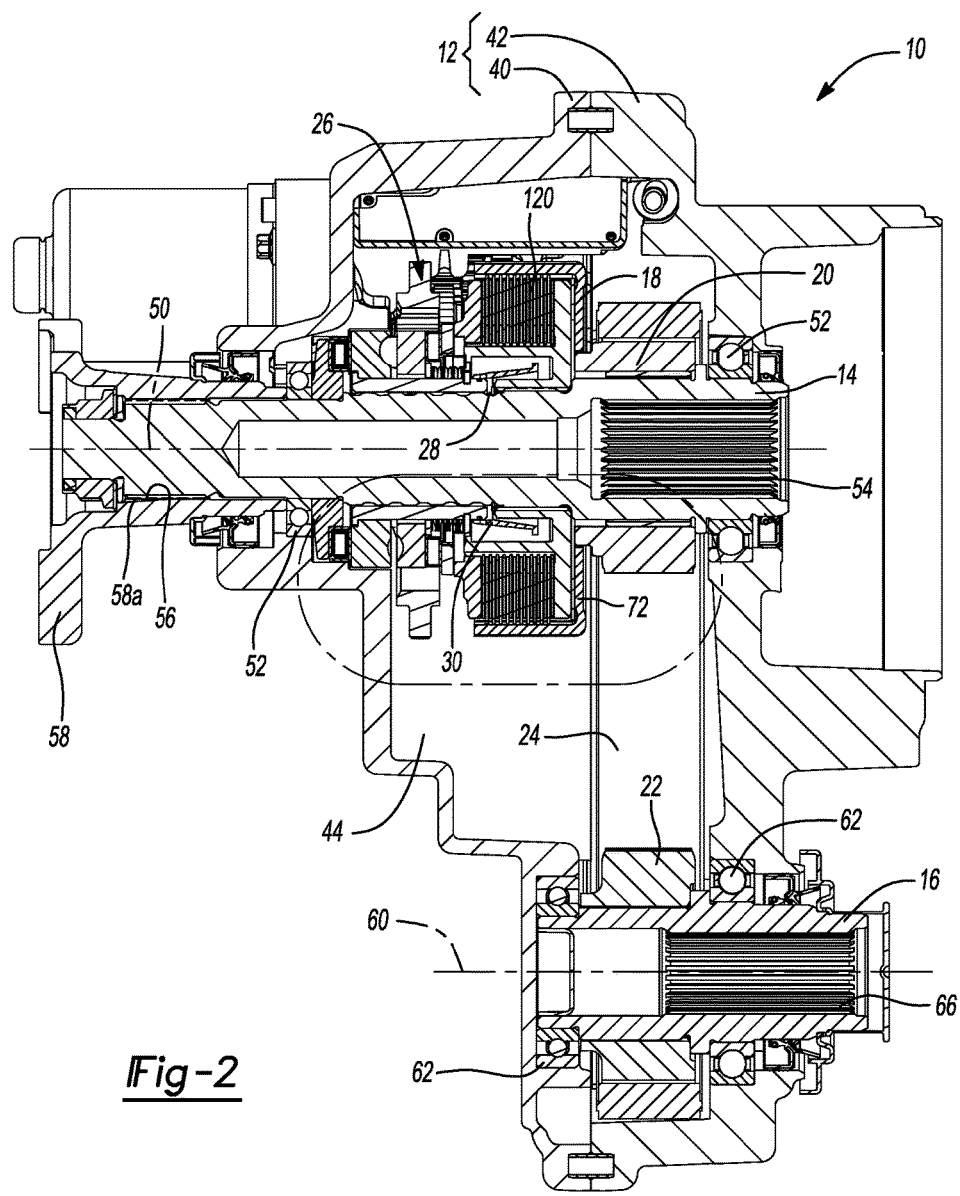
FIG. 2 is a section view taken through the power transmitting component of FIG. 1.

With reference to FIG. 2, the power transmitting component 10 can include a housing 12, a first shaft 14, a second shaft 16, a friction clutch 18, a drive element 20, a driven element 22, an endless power transmitting component 24, a clutch actuator 26, a lubricant passage 28 and an oil spout 30. The housing 12 can comprises first and second housing halves 40 and 42, respectively, that can be fastened together to define an internal cavity 44 into which the first and second shafts 14 and 16, the friction clutch 18, the drive and driven elements 20 and 22, the endless power transmitting component 24, the clutch actuator 26 and the oil spout 30 can be received.

The first shaft 14 can be supported for rotation about a first axis 50 relative to the housing 12 by a pair of first bearings 52. In the example provided, the first shaft 14 has female splined input end 54 and a male splined output end 56. The input end 54 is configured to receive and mating engage a male splined end (not shown) of power and drive train (not shown) that provides a source of rotary power. The output end 56 can be matingly engaged to a female splined aperture 58a in an output flange 58 that can be coupled to a propshaft (not shown) in a conventional manner. The propshaft can conventionally transmit rotary power to a rear axle assembly (not shown).

The second shaft 16 can be supported for rotation about a second axis 60 relative to the housing 12 by a pair of second bearings 62. The second axis 60 can be parallel to the first axis 50. The second shaft 16 can have a female splined output end 66 that can be configured to engage a male splined end (not shown) of a shaft (not shown) that transmits rotary power to a front axle assembly (not shown).

Figure 3:
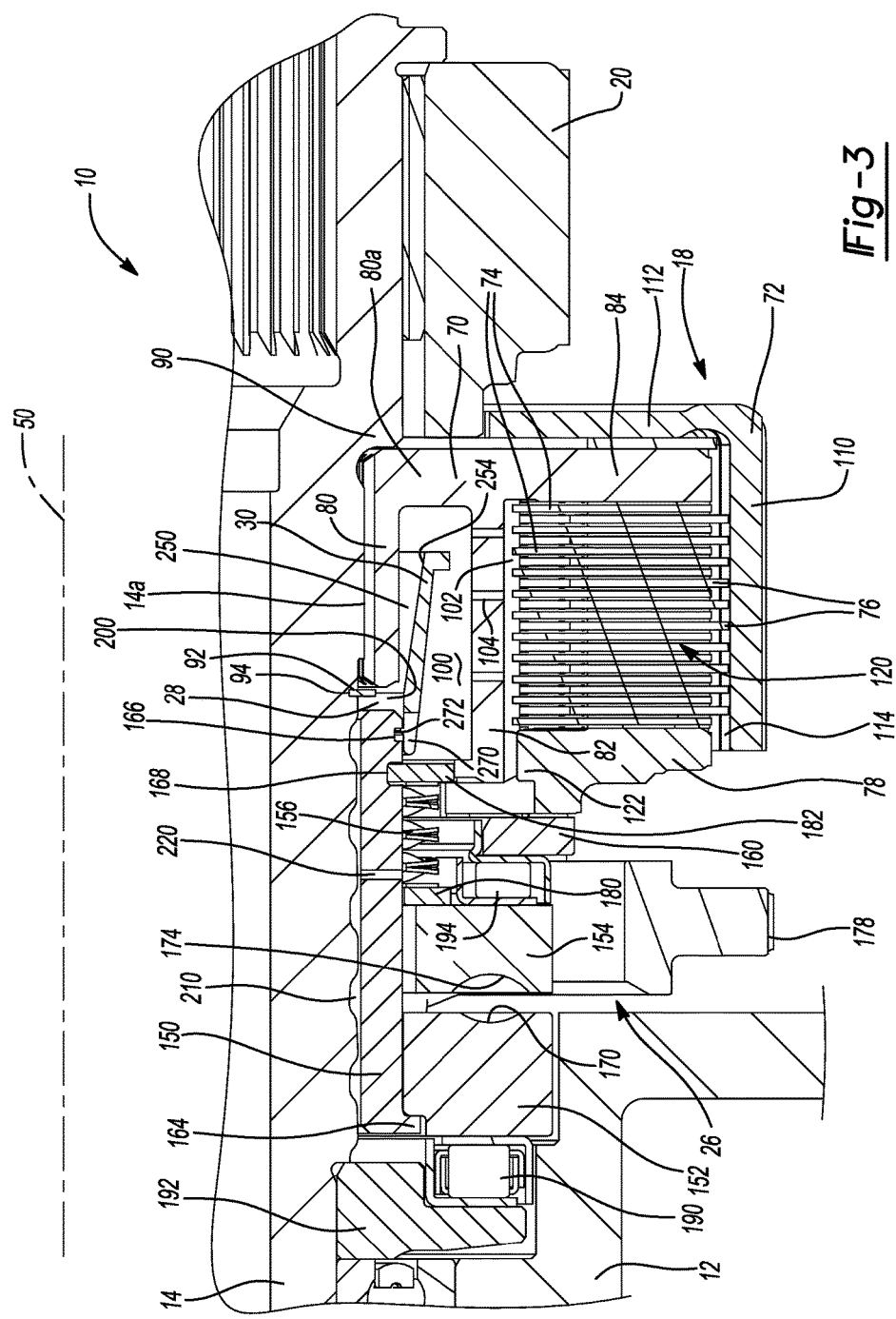
FIG. 3 is an enlarged portion of FIG. 2.

With reference to FIG. 3, the friction clutch 18 can include a clutch hub 70, a clutch basket 72, a plurality of first clutch plates 74, a plurality of second clutch plates 76 and a pressure plate 78. The clutch hub 70 can have a hub portion 80, a first plate mount 82, which can be fixedly coupled to the hub portion 80, and an annular plate 84 that can be fixedly coupled to and extend radially outwardly from the first plate mount 82. The hub portion 80 can be non-rotatably coupled to the first shaft 14 in any desired manner. In the example shown, the hub portion 80 defines a female splined aperture that is received on a male splined segment 14a of the first shaft 14. The clutch hub 70 can be abutted against a shoulder 90 on the first shaft 14 and an external snap ring 92, which is received in a ring groove 94 formed in the first shaft 14, can be employed to inhibit or limit movement of the clutch hub 70 along the first axis 50 in a direction away from the shoulder 90. The first plate mount 82 can be an annular structure that can be spaced radially outwardly from and concentrically about the clutch hub 70 to define an annular lubricant chamber 100 there between. The first plate mount 82 can have a radially outer surface having a plurality of spline teeth 102 formed thereon. Optionally, a plurality of clutch plate lubricant passages 104 could be formed radially through the first plate mount 82 so as to intersect the lubricant chamber 100.

The clutch basket 72 can be a drum-like structure having a second plate mount 110 and an annular wall member 112. The second plate mount 110 can be a circumferentially extending wall that is disposed concentrically about the first plate mount 82. The second plate mount 110 can have an inner circumferential surface, which can have a plurality of spline teeth 114 formed thereon. The annular wall member 112 can extend radially inwardly from the second plate mount 110.

The first clutch plates 74 can be axially slidably but non-rotatably coupled to the first plate mount 82. In the example provided, the first clutch plates 74 conventionally have an aperture that defines a plurality of spline teeth (not specifically shown) and the first plate mount 82 is received into the aperture such that the spline teeth 102 of the first plate mount 82 meshingly engage the spline teeth of the first clutch plates 74.

The second clutch plates 76 can be interleaved with the first clutch plates 74 and can be axially slidably but non-rotatably coupled to the second plate mount 110. In the example provided, the second clutch plates 76 conventionally have an outer diametrical surface that defines a plurality of spline teeth (not specifically shown) and the second clutch plates 76 are received into the second plate mount 110 such that the spline teeth of the second clutch plates 76 meshingly engage the spline teeth 114 of the second plate mount 110.

The first and second clutch plates 74 and 76 can collective form a clutch pack 120 and the pressure plate 78 can be disposed on a side of the clutch pack 120 that is opposite the annular wall member 112 of the clutch basket 72. The pressure plate 78 can be axially slidably but non-rotatably coupled to the first plate mount 82. For example, the pressure plate 78 can have an aperture that defines a plurality of spline teeth 122 and which receives the first plate mount 82 such that the spline teeth 102 of the first plate mount 82 meshingly engage the spline teeth 122 of the pressure plate 78.

Returning to FIG. 2, the drive element 20 can be coupled to the clutch basket 72 for common or joint rotation, the driven element 22 can be coupled to the second shaft 16 for common or joint rotation, and the endless power transmitting component 24 is configured to transmit rotary power between the drive element 20 and the driven element 22. In the example provided, the drive and driven elements 20 and 22 are sprockets and the endless power transmitting component is a loop of chain. It will be appreciated, however, that the drive and driven elements 20 and 22 could be pulleys and the endless power transmitting component 24 could be a belt.

With renewed reference to FIG. 3, the clutch actuator 26 is configured to can be any type of actuator that develop and exert force onto the friction clutch 18 to frictionally engage the first and second clutch plates 74 and 76 to one permit the transmission of rotary power between the clutch hub 70 and the clutch basket 72. In the example provided, the clutch actuator is a ball-ramp actuator and comprises a sleeve 150, a first ball-ramp cam 152, a second ball-ramp cam 154, a biasing spring 156, a plurality of spherical balls (not shown) received between the first and second ball-ramp cams 152 and 154, and an actuator output member 160. The sleeve 150 can be a tubular structure that can be received on the first shaft 14. The sleeve 150 can define a shoulder 164, which can be located proximate a first axial end of the sleeve 150, an oil spout retaining groove 166, which can be located proximate a second axial end of the sleeve 150 opposite the first axial end, and a retaining ring groove 168 that can be disposed between the shoulder 164 and the oil spout retaining groove 166 nearer to the oil spout retaining groove 166.

The first ball-ramp cam 152 can be fixedly coupled to the housing 12 and can define a plurality of first ball-ramp grooves 170 that are formed into an axial end face of the first ball-ramp cam 152. The first ball-ramp grooves 170 extend in a circumferential direction and the depth of each of the first ball-ramp grooves 170 varies (i.e., tapers) between its opposite ends. The first ball-ramp cam 152 can be fixedly coupled to the sleeve 150 and can be abutted against the shoulder 164. In the example provided, the first ball-ramp cam 152 is press-fit to the sleeve 150, but it will be appreciated that any means, including fasteners and/or splines can be employed to fixedly and/or non-rotatably couple the first ball-ramp cam 152 to the sleeve 150.

The second ball-ramp cam 154 can be received over the sleeve 150 and can define a plurality of second ball-ramp grooves 174 that are formed into an axial end face of the second ball-ramp cam 154. The second ball-ramp grooves 174 extend in a circumferential direction and the depth of each of the second ball-ramp grooves 174 varies (i.e., tapers) between its opposite ends in a manner that is opposite the manner in which each of the first ball-ramp grooves 170 varies (i.e., tapers) between its opposite ends. The second ball-ramp cam 154 is rotatable about the first axis 50 between a first cam position and second cam position. The second ball-ramp cam 154 is also axially movable along the first axis 50 relative to the first ball-ramp cam 152. In the example provided, a gear 178 is employed to rotate the second ball-ramp cam 154 about the first axis 50. The second ball-ramp cam 154 is mounted to the gear 178 concentrically within the gear 178.

The biasing spring 156 can comprise one or more springs that can bias the second ball-ramp cam 154 along the first axis 50 toward the first ball-ramp cam 152. In the example provided, the biasing spring 156 comprises a wave spring that is disposed between a thrust washer 180, which is slidably received on the sleeve 150 and abuts the second ball-ramp cam 154 on a side opposite the first ball-ramp cam 152, and an external snap ring 182 that is received in the retaining ring groove 168 formed in the sleeve 150.

The spherical balls are received between the first and second ball-ramp cams 152 and 154 and each of the spherical balls is received in an associated one of the first ball-ramp grooves 170 and an associated one of the second ball-ramp grooves 174. Rotation of the second ball-ramp cam 154 (via the gear 178) from its first cam position to its second cam position conventionally causes the spherical balls to roll between the first and second ball-ramp cams 152 and 154 into shallower regions of the first and second ball-ramp grooves 170 and 174, which overcomes the biasing force of the biasing spring 156 and causes the second ball-ramp cam 154 to translate along the first axis 50 in a direction away from the first ball-ramp cam 152. Similarly, rotation of the second ball-ramp cam 154 (via the gear 178) from its second cam position to its first cam position conventionally causes the spherical balls to roll between the first and second ball-ramp cams 152 and 154 into deeper regions of the first and second ball-ramp grooves 170 and 174, which permits the biasing spring 156 to urge the second ball-ramp cam 154 along the first axis 50 in a direction toward the first ball-ramp cam 152.

In the example provided, a first thrust bearing 190 is disposed between the first ball-ramp cam 152 and a flange 192 that is fixedly coupled to the first shaft 14, a second thrust bearing 194 is disposed between the second ball-ramp cam 154 and the actuator output member 160. In this example, the actuator output member 160 is an apply plate that is configured to transmit force between the second ball-ramp cam 154 and the pressure plate 78.

The lubricant passage 28 extends between the first shaft 14 and the lubricant chamber 100 and has a passage outlet 200 that intersects the lubricant chamber 100. The lubricant passage 28 is configured to transmit a lubricant (i.e., oil) into the lubricant chamber 100. In the example provided, the lubricant passage 28 is illustrated as being an axial gap between the sleeve 150 and the hub portion 80 of the clutch hub 70. It will be appreciated, however, that the lubricant passage 28 could comprise one or more holes that are formed through the hub portion 80, the first shaft 14 and/or a structure on the first shaft 14 that is adjacent the portion—(e.g., the sleeve 150). In the example provided, a spiral groove 210 is employed to urge lubricant between the first shaft 14 and the sleeve 150 toward the lubricant passage 28. The spiral groove 210 is formed on the exterior circumferential surface of the first shaft 14 in the example provided, but it will be appreciated that the spiral groove 210 could be formed into the interior circumferential surface of the sleeve 150 in the alternative. A chamfer formed on the inside diameter of the sleeve 150 on the end of the sleeve 150 that is adjacent to the lubricant passage 28, as well as the external snap ring 92 that retains the clutch hub 70 to the first shaft 14, can help to direct lubricant flowing between the sleeve 150 and the first shaft 14 to enter and travel through the lubricant passage 28.

If desired, one or more auxiliary lubricant passages 220 could be formed in the sleeve 150. In the example shown, one or more auxiliary passages 220 could be circumferentially spaced apart from one another and can extend through the sleeve 150 at a location radially in-line but radially inward of the second thrust bearing 194. Lubricant passing through the auxiliary passage(s) 220 can aid in lubricating the second thrust bearing 194, as well as the interfaces between the second thrust bearing 194 and the actuator output member 160.

The oil spout 30 can be received in the lubricant chamber 100 and can extend along the first axis 50 such that the oil spout 30 is disposed about a portion of the hub portion 80 and the lubricant passage 28. The oil spout 30 can diverge radially outwardly from the hub portion 80 with increasing distance from the passage outlet 200 of the lubricant passage 28 in a direction toward an oil spout outlet 250.

Figure 4:
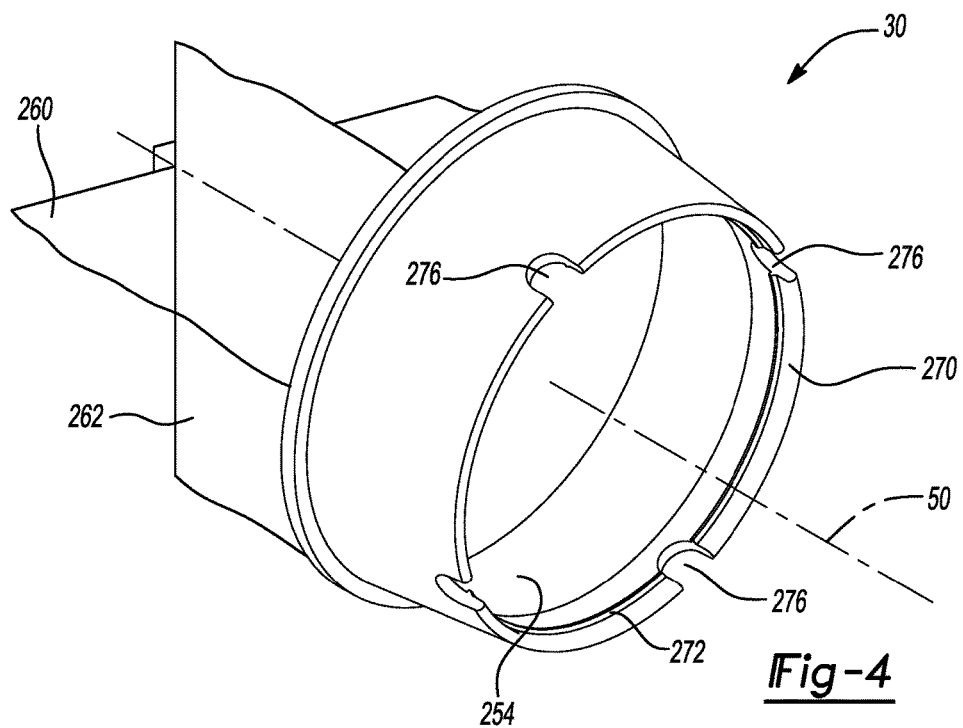
FIG. 4 is a rear perspective view of a portion of the power transmitting component of FIG. 1, illustrating an exemplary oil spout in more detail.
Figure 5:
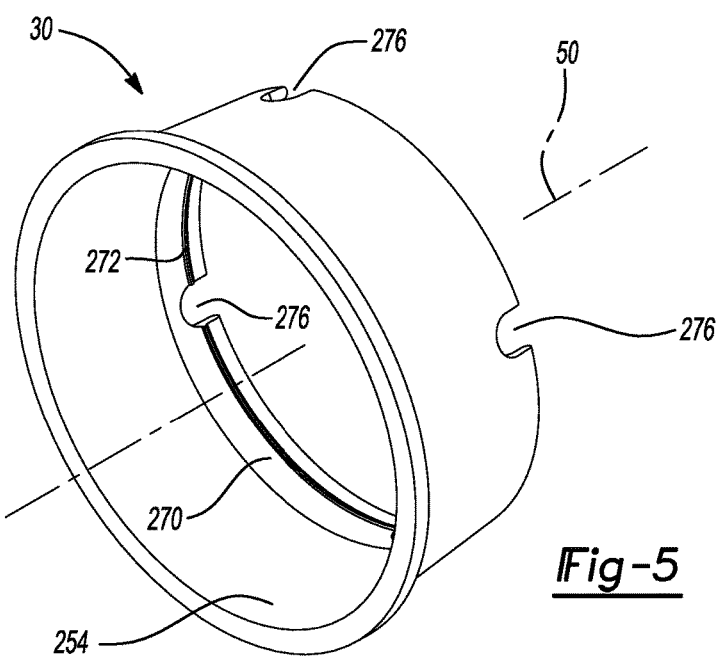
FIG. 5 is a front perspective view of the oil spout.
Figure 6:
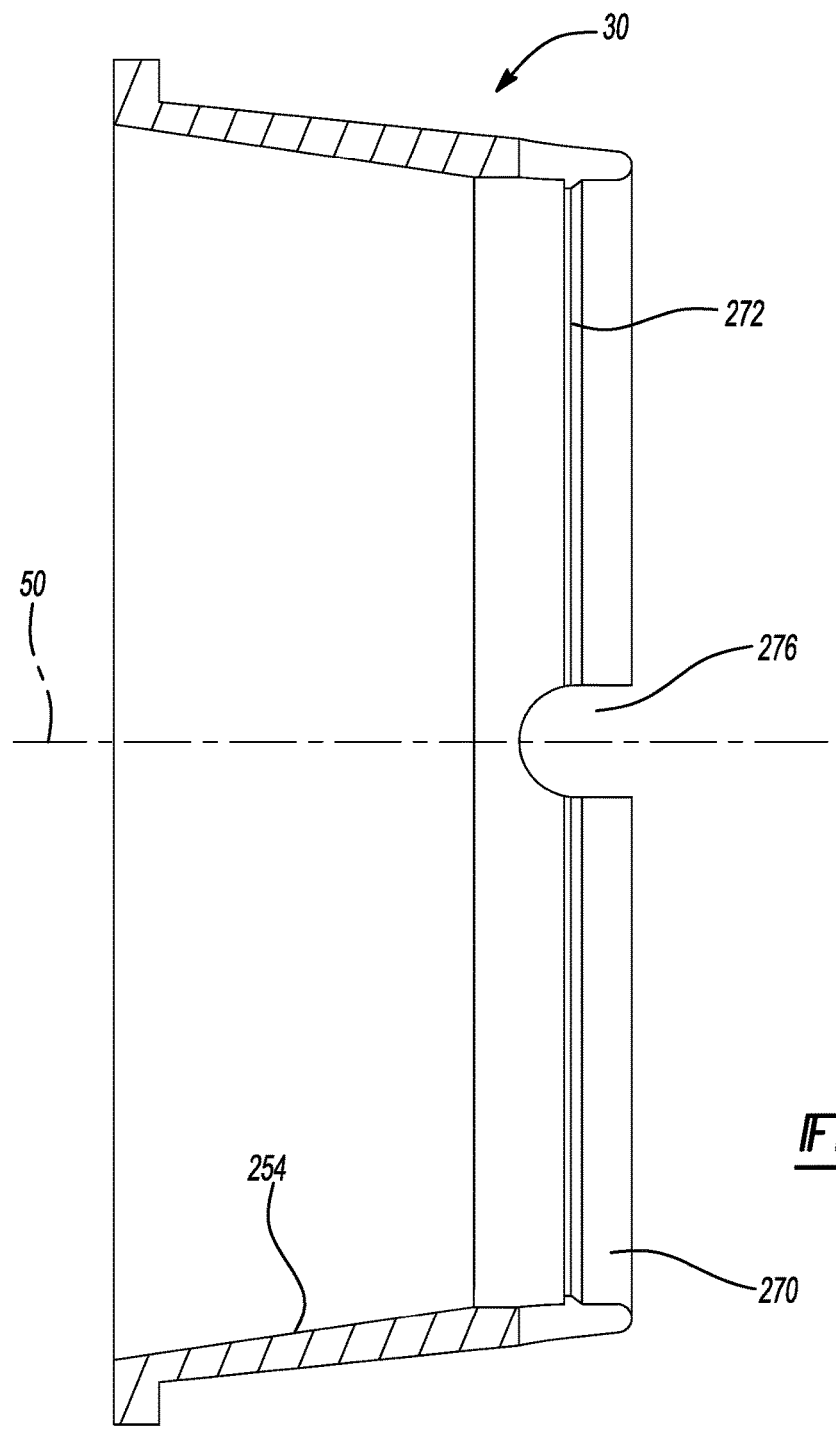
FIG. 6 is a section view of the oil spout.

With reference to FIGS. 4 through 6, the oil spout 30 can be shaped in a symmetric manner about the first axis 50 with a frusto-conical interior surface 254. As such, the oil spout 30 can extend about the entire circumference of the hub portion 80 (FIG. 3). Moreover, this configuration renders the configuration of the portion of oil spout 30 that is disposed about the hub portion 80 (FIG. 3) not only symmetric about a first (imaginary) plane 260 that includes the first axis 50, but also symmetric about a second (imaginary) plane 262 that is perpendicular to the first plane 260 and which the first axis 50 is the intersection of the first and second planes 260 and 262. It will be appreciated, however, that the oil spout 30 could be shaped differently. For example, the portion of the oil spout 30 that extends about the hub portion 80 could be formed in a manner that is symmetric about the first plane 260 but not symmetric about the second plane 262. Moreover, the oil spout 30 could be configured so that it does not extend completely about the hub portion 80 (FIG. 3) in the circumferential direction.

Figure 3A:
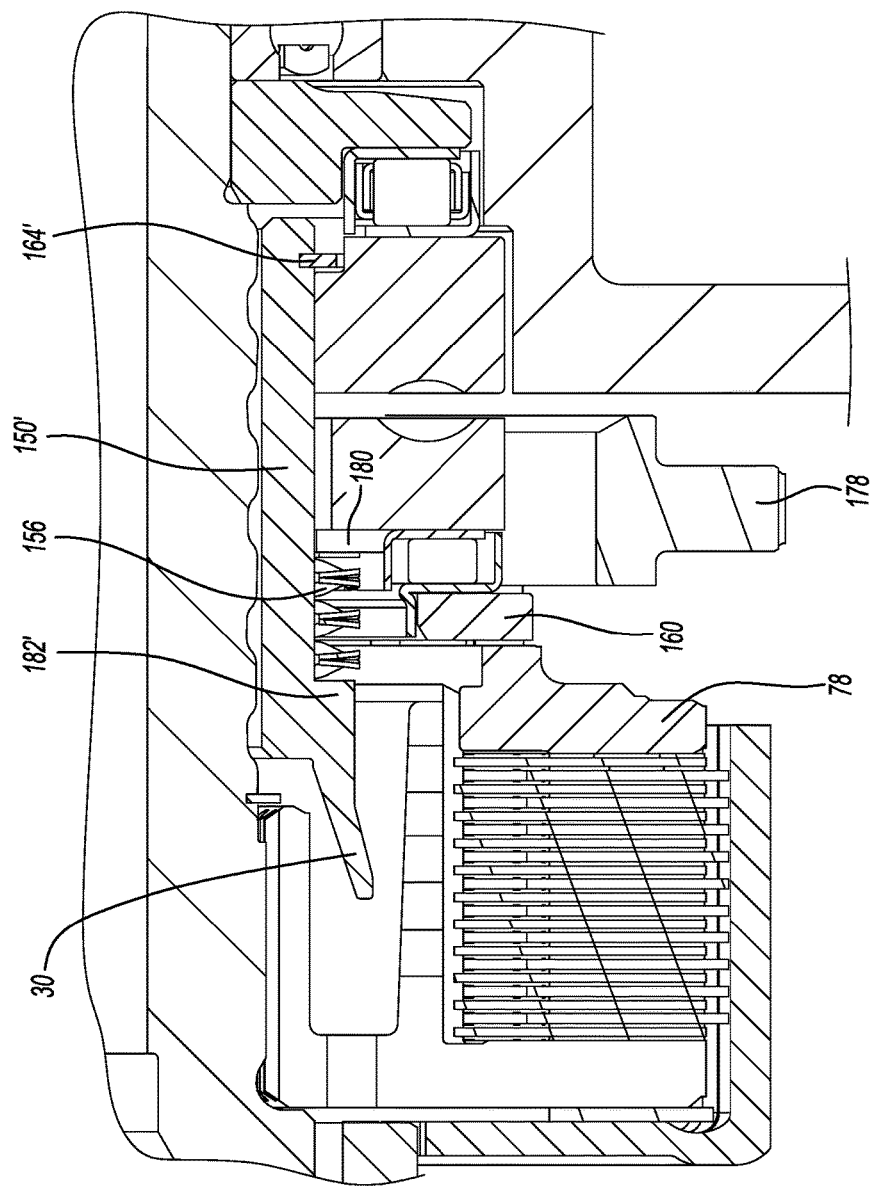
FIG. 3A is a view similar to that of FIG. 3 but illustrating an arrangement in which an oil spout is unitarily and integrally formed with a sleeve.

Returning to FIG. 3, the oil spout 30 can be fixedly coupled to any structure that permits the oil spout 30 to extend into the lubricant chamber 100 and diverge radially outwardly from the passage outlet 200. If the lubricant passage 28 were to be formed directly in the hub portion 80, for example, the oil spout 30 could be fixedly coupled directly to the hub portion 80. In the example provided, however, the oil spout 30 has a base 270 that is coupled directly to the sleeve 150 in a snap-fit manner. In this regard, the base 270 defines an internal, circumferentially extending rib 272 that is received into the oil spout retaining groove 166 in the sleeve 150. It will be appreciated, however, that other means can be employed to secure the base 270 of the oil spout 30, including one or more fasteners, adhesives, a press-fit or interference fit, or a band clamp. Alternatively, the oil spout 30 could be unitarily and integrally formed with the sleeve 150 as is shown in FIG. 3A, In this example, an external snap ring 164' could be employed instead of the shoulder 164 (FIG. 3), and the biasing spring 156 can abut a shoulder 182' that is integrally formed with the sleeve 150' instead of the external snap ring 182 (FIG. 3). With renewed reference to FIG. 3, notches 276 (FIG. 4) or other stress-relieving features can be formed into the base 270 if desired. As noted previously, the inside circumferential surface 254 of the portion of the oil spout 30 that extends about the hub portion 80 is frusto-conically shaped. If desired, one or more apertures (not shown) could be formed through the oil spout 30, but in the example provided, no holes or other features are formed in or on this portion of the oil spout 30.

During operation of the power transmitting component 10, oil transmitted between the first shaft 14 and the sleeve 150 is directed into the lubricant passage 28. Lubricant exits the lubricant passage 28 through the passage outlet 200 and enters the lubricant chamber 100, where it can drain onto the inside circumferential surface 254 of the oil spout 30. The diverging shape of the oil spout 30 can cause the oil on the inside circumferential surface 254 of the oil spout 30 to drain to a desired location, such as out the oil spout outlet 250 of the oil spout 30 proximate a radially extending wall member 80a of the hub portion 80 that connects the hub portion 80 to the first plate mount 82. Since the clutch hub 70 rotates with the first shaft 14, oil dispensed from the oil spout 30 will tend to collect against the radially inner surface of the first plate mount 82 so that the oil can be dispensed through the clutch plate lubricant passages 104 to lubricate the first and second clutch plates 74 and 76.

The mounting of the oil spout 30 on the sleeve 150 is advantageous in the example provided because it permits the clutch actuator 26 to be installed to the first housing half 40 and the oil spout 30 to be installed to the sleeve 150 to form a first assembly, and permits the first shaft 14 and the second shaft 16 to be installed in the second housing half 42 and the friction clutch to be installed onto the first shaft 14 to form a second assembly. Thereafter, the first and second assemblies can be mated to one another and threaded fasteners can be employed to secure the first and second housing halves 40 and 42 to one another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting device comprising:
a housing;
a shaft supported for rotation in the housing, the shaft having an outer circumferential surface;
a friction clutch received in the housing having a clutch hub, a clutch basket, a plurality of first clutch plates, and a plurality of second clutch plates, the clutch hub having a hub portion, which is non-rotatably coupled to the shaft, a first plate mount and an annular lubricant chamber having opposite radial sides defined by the hub portion and the first plate mount, the clutch basket having a second plate mount that is disposed concentrically about first plate mount, the first clutch plates being axially slidably but non-rotatably coupled to the first plate mount, the second clutch plates being axially slidably but non-rotatably coupled to the second plate mount, the second clutch plates being interleaved with the first clutch plates;
a sleeve that is received about the outer circumferential surface of the shaft and non-rotatably coupled to the housing;
a lubricant passage having a passage outlet that is in fluid communication with the lubricant chamber, at least a portion of the lubricant passage being disposed radially between the outer circumferential surface of the shaft and the lubricant chamber; and
an oil spout fixedly coupled to the sleeve, the oil spout being received in the lubricant chamber and extending along a longitudinal axis of the shaft such that the oil spout is disposed about the lubricant passage and a portion of the hub portion, the oil spout diverging radially outwardly from the hub portion with increasing distance from the passage outlet of the lubricant passage in a direction toward an outlet of the oil spout.

2. The power transmitting component of claim 1, wherein at least a portion of an inside circumferential surface of the oil spout is frusto-conically shaped.

3. The power transmitting component of claim 1, wherein the oil spout is snap-fit to the sleeve.

4. The power transmitting component of claim 3, wherein the oil spout defines a circumferentially extending rib that is received into an annular groove that is formed in the sleeve.

5. The power transmitting component of claim 3, wherein a plurality of circumferentially spaced apart stress-relieving features are formed about a mounting portion of the oil spout.

6. The power transmitting component of claim 5, wherein the stress-relieving features comprise notches.

7. The power transmitting component of claim 1, wherein the sleeve carries a ball-ramp actuator having a first ball-ramp cam and a second ball-ramp cam, the first ball-ramp cam being fixedly and non-rotatably couple to the sleeve, the second ball-ramp cam being rotatably and axially movably mounted on the sleeve.

8. The power transmitting component of claim 7, further comprising a spring received on the sleeve and biasing the second ball-ramp cam toward the first ball-ramp cam.

9. The power transmitting component of claim 1, wherein a helical groove is formed into the shaft at a location on which the sleeve is disposed.

10. The power transmitting component of claim 9, wherein the helical groove terminates radially in-line with the lubricant passage.

11. The power transmitting component of claim 1, wherein a plurality of clutch plate lubricant passages are formed through the first plate mount.

12. The power transmitting component of claim 1, wherein the oil spout extends about the entire circumference of the portion of the hub portion.

13. The power transmitting component of claim 12, wherein the oil spout is symmetric about a first plane, the first axis being disposed in the first plane.

14. The power transmitting component of claim 13, wherein the oil spout is also symmetric about a second plane, the second plane being perpendicular to the first plane, the first axis being located at an intersection between the first and second planes.

15. A power transmitting component comprising:
a housing;

a first shaft supported in the housing for rotation about a first axis;

a second shaft supported in the housing for rotation about a second axis;

a friction clutch having a clutch hub, a clutch basket, a plurality of first clutch plates, and a plurality of second clutch plates, the clutch hub having a hub portion, which is non-rotatably coupled to the first shaft, a first plate mount and an annular lubricant chamber having a first annular surface that is formed on the first plate mount and a second annular surface that is disposed radially inward of the first annular surface and which is formed on the hub portion, the clutch basket having a second plate mount that is disposed concentrically about first plate mount, the first clutch plates being axially slidably but non-rotatably coupled to the first plate mount, the second clutch plates being axially slidably but non-rotatably coupled to the second plate mount, the second clutch plates being interleaved with the first clutch plates;

a drive element coupled to the clutch basket for rotation therewith;

a driven element coupled to the second shaft for common rotation;

an endless power transmitting element engaging the drive element and the driven element to transmit rotary power there between;

a sleeve that is received about an outer circumferential surface of the first shaft and non-rotatably coupled to the housing;

a lubricant passage having a passage outlet that is in fluid communication with the lubricant chamber, at least a portion of the lubricant passage being disposed radially between the outer circumferential surfaces of the first shaft and the lubricant chamber; and an oil spout fixedly coupled to the sleeve, the oil spout being received in the lubricant chamber and extending along a longitudinal axis of the shaft such that the oil spout is disposed about the lubricant passage and a portion of the hub portion, the oil spout diverging radially outwardly from the hub portion with increasing distance from the passage outlet of the lubricant passage in a direction toward an outlet of the oil spout.

16. The power transmitting component of claim 15, further comprising a clutch actuator having an actuator output member that is configured to translate along the first axis to selectively engage the first and second clutch plates to one another.

17. The power transmitting component of claim 16, wherein the clutch actuator further comprises a first ball-ramp cam and a second ball-ramp cam, wherein the first ball-ramp cam is non-rotatably coupled to the sleeve.

18. The power transmitting component of claim 15, wherein the oil spout defines a circumferentially extending rib that is received into an annular groove that is formed in the sleeve.

19. The power transmitting component of claim 15, wherein the oil spout is unitarily and integrally formed with the sleeve.

20. The power transmitting component of claim 15, wherein at least a portion of an inside circumferential surface of the oil spout is frusto-conically shaped.

21. The power transmitting component of claim 15, wherein the oil spout extends about the entire circumference of the portion of the hub.

22. The power transmitting component of claim 21, wherein the oil spout is symmetric about a first plane, the first axis being disposed in the first plane.

23. The power transmitting component of claim 22, wherein the oil spout is also symmetric about a second plane, the second plane being perpendicular to the first plane, the first axis being located at an intersection between the first and second planes.

* * * * *